Oct. 22, 1968  J. ZEMANEK, JR  3,406,780
ACOUSTIC WELL LOGGING TOOL AND METHOD
Filed May 29, 1967  2 Sheets-Sheet 1
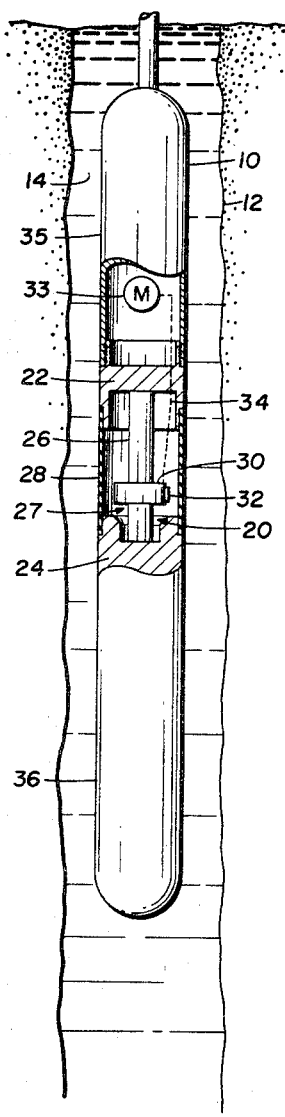
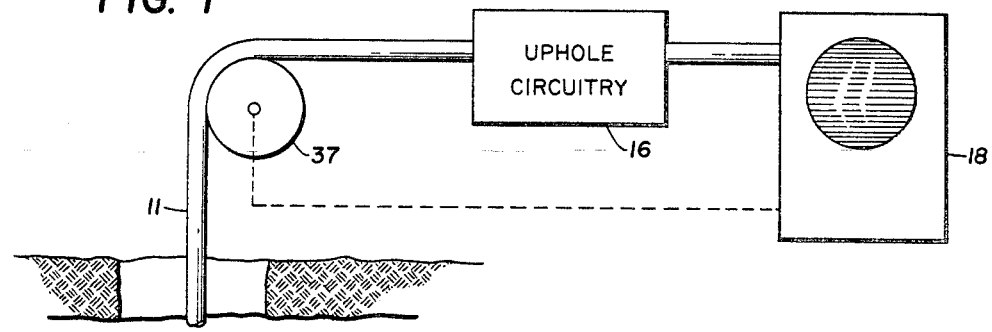
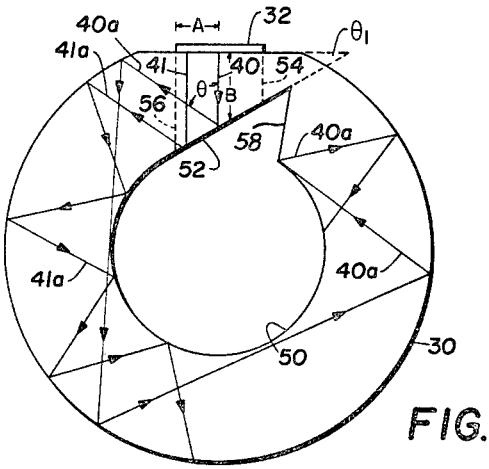
FIG. 3
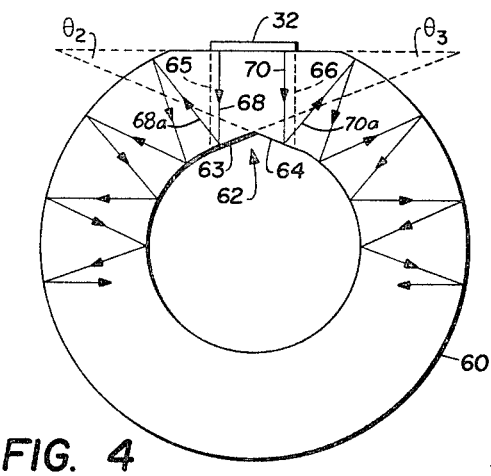
FIG. 4
INVENTOR
JOSEPH ZEMANEK, JR.
ATTORNEY Oct. 22, 1968   J. ZEMANEK, JR   3,406,780
ACOUSTIC WELL LOGGING TOOL AND METHOD
Filed May 29, 1967                                2 Sheets-Sheet 2
FIG. 5
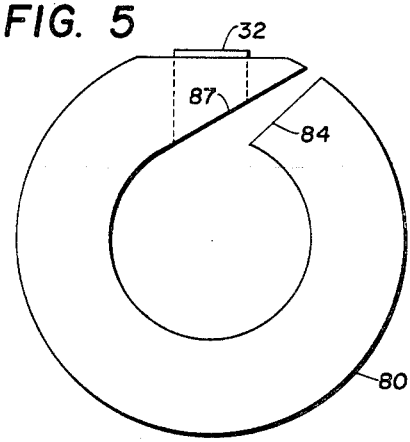
FIG. 6
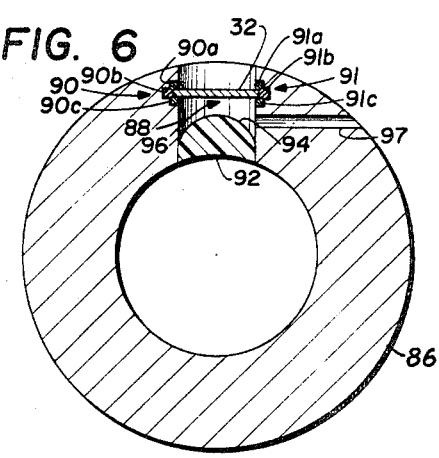
FIG. 7
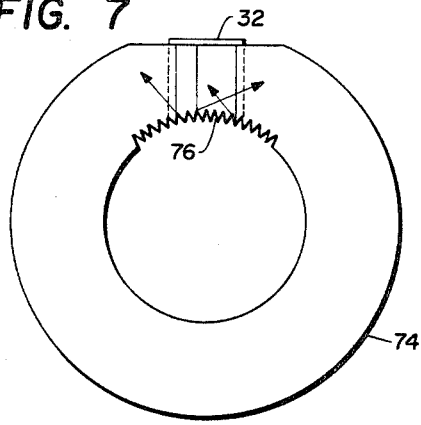
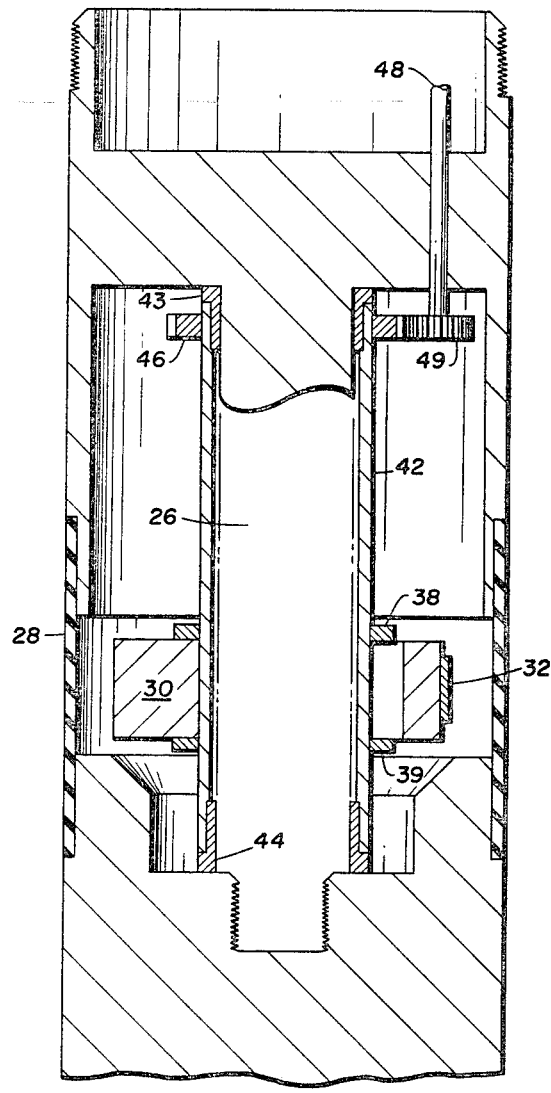
FIG. 2
INVENTOR
JOSEPH ZEMANEK, JR.
ATTORNEY United States Patent Office 3,406,780
Patented Oct. 22, 1968

3,406,780
ACOUSTIC WELL LOGGING TOOL AND METHOD
Joseph Zemanek, Jr., Dallas, Tex., assignor to Mobil Oil
Corporation, a corporation of New York
Filed May 29, 1967, Ser. No. 641,989
29 Claims. (Cl. 181—.5)

ABSTRACT OF THE DISCLOSURE

This specification discloses an acoustic well logging method in which acoustic energy transmitted from a transceiver along a secondary path is contacted by a reflective interface so as to reflect a substantial portion of the energy away from the transceiver. Disclosed also is an acuostic well logging tool wherein the support for the transceiver is provided with a reflective interface which intersects an inward energy transmission path at an oblique angle.

*Background of the invention—Field of the invention*

This invention relates to acoustic well logging and more particularly to acoustic well logging methods and systems in which an acoustic transducer is utilized both for the transmission and reception of acoustic energy.

*Description of the prior art*

It is a conventional practice to survey a well or the subterranean formations penetrated thereby by acoustic logging techniques in which acoustic signals, normally at frequencies predominantly in the ultrasonic range, are generated and received by a logging tool run through the well. One acoustic logging technique involves the generation and reception of acoustic signals and the determination of the travel time of such signals between the transmitting and receiving transducers. By this technique, the velocity of sound through a given stratum may be determined in order to gain information regarding the lithology of the stratum. Another technique involves the generation and reception of directional acoustic energy, usually in a rotational mode, in order to obtain an indication of the configuration of the well and/or the presence or absence of anomalies in the wall of the well or within the adjacent formations.

When utilizing separate directional transducers for the transmission and reception of acoustic energy is becomes necessary for best results to focus the transducers with regard to the subterranean interface under investigation. For example, in the acoustic logging of a well in order to determine the presence or absence of anomalies in the wall thereof, it is desirable to incline the transmitter and receiver toward one another in order that their respective directional transmission and reception paths meet on the wall of the well. While this presents no problem when logging in a well of a known uniform diameter, in actual practice the well may vary considerably throughout the extent which is to be logged. For example, should the well penetrate formations of loosely consolidated sand, the wall may slough off somewhat thus increasing the well diameter within these sections. In circumstances such as described above it will be recognized that the use of separate transmitting and receiving transducers oriented at a fixed focal distance may produce unacceptable results.

In order to avoid the disadvantages inherent in the use of separate transmitting and receiving transducers it has heretofore been proposed to utilize a single transducer, commonly termed a transceiver, for both transmission and reception of acoustic energy. The transceiver is oriented within the well such that its directional transmission path is normal to the wall of the well. Since the transmitted acoustic energy strikes the wall of the well at an angle of incidence of zero or near zero, the reflected energy will travel along the same general path as the transmitted energy, thus enabling a single logging run to be made in wells of widely varying diameter. Thus, it will be recognized that when utilizing a logging tool employing an acoustic transceiver as described above the system requires no focusing changes to accommodate wells of widely varying diameters.

One problem encountered in logging with transceivers, as well as in logging with separate transmitting and receiving transducers, is a high level of background "noise" which often is picked up by the transceiver or receiving transducer and tends to mask the received survey signal. This noise is due predominantly to the trapping of acoustic energy within the logging tool itself and often is accentuated because of the design of the tool. In this regard, it normally is desirable to construct well logging tools of rugged, high-strength materials because of the extreme pressure and temperature conditions which may be encountered in wells. Also, it is most desirable to provide protective shielding around the relatively fragile acoustic elements and the attendant circuitry in order to protect them from impact injury. Unfortunately, the structurally rigid materials such as steel which normally are utilized in forming the structural frame of a logging tool afford good transmission paths for acoustic energy and accordingly contribute materially to the noise in the logging tool. In order to reduce the background noise, numerous techniques have been proposed in order to acoustically isolate the various acoustic elements with respect to the structural elements of logging tools.

*Summary of the invention*

In accordance with the present invention, there is provided an acoustic well logging method and tool utilizing a transceiver and in which acoustic noise is maintained at an acceptably low level. This is accomplished in the present invention through the use of an interface formed of acoustically mismatched materials which is oriented relative to the transceiver in order to reflect a substantial portion of the acoustic energy contributing to background noise away from the transceiver.

In carrying out the method of the present invention a logging tool of the transceiver type is located within a well under investigation. Acoustic energy is directionally transmitted from the transceiver along a primary transmission path which is normal to a subterranean interface, e.g., the wall of the well. A portion of the transmitted energy is reflected from the subterranean interface and received by the transceiver. Concomitantly with the transmission of acoustic energy along the aforementioned primary path, acoustic energy is transmitted from the transceiver along a secondary transmission path which is opposed in direction to the primary path. The acoustic energy transmitted along this secondary path is contacted at an oblique angle with a reflective interface within the well formed of acoustically mismatched materials and a substantial portion of the energy is reflected away from the transceiver, thus reducing significantly the noise transmitted to the transceiver at the time it receives reflected acoustic energy from the subterranean interface under investigation.

In another aspect of the invention, there is provided an acoustic well logging tool which comprises a transceiver support mounted in the tool and an acoustic transceiver firmly mounted on the support. The transceiver functions to transmit acoustic energy away from the support along an outward transmission path and to receive reflected acoustic energy. Upon firing of the transceiver, acoustic energy also is transmitted inwardly along an inward transmission path through the support. In accordance with this aspect of the invention, there is provided means in the transceiver support forming a reflective interface acoustically mismatched materials behind the transceiver and intersecting the inward transmission path at an oblique angle. Thus, a substantial portion of the acoustic energy transmitted along the inward path is reflected through the support and away from the transceiver where it is attenuated, thus reducing the noise level at the transceiver.

In a preferred embodiment of the invention, the transceiver support is rotatably mounted within a compartment in the tool which affords impact protection for the transceiver. In yet another preferred embodiment of the invention, the transceiver support is annular shaped and thus provides a relatively long path for the reflected acoustic energy within which attenuation may be accomplished, thus reducing greatly the amplitude of any energy which may ultimately be transmitted through the support back to the transceiver.

*Brief description of the drawings*

FIGURE 1 is a schematic illustration, partly in section, of an acoustic logging system including a logging tool embodying the present invention;

FIGURE 2 is an illustration, partly in section, showing in detail a portion of the tool shown in FIGURE 1;

FIGURE 3 is an end elevation of the transceiver support shown in FIGURE 2;

FIGURE 4 is an end elevation of a transceiver support in which there is provided a divergent reflective interface;

FIGURE 5 is an end elevation of a transceiver support provided with a recess extending laterally through the support;

FIGURE 6 is a sectional view of a transceiver support embodying another form of reflective interface; and FIGURE 7 is an end elevation of a transceiver support embodying yet another form of reflective interface.

*Description of specific embodiments*

With reference to FIGURE 1, there is illustrated schematically an acoustic logging system embodying the improved logging tool of the present invention. The system includes an elongated logging tool 10 which is shown as extended from a cable 11 within a well 12. The well 12 is filled with a fluid, such as drilling mud, indicated by reference numeral 14. The logging system also includes remote circuitry 16 at the surface and a suitable display means such as a cathode ray oscilloscope 18 upon which a facsimile of the wall of the well may be displayed.

The logging tool includes a support structure 20 which comprises upper and lower panels 22 and 24, respectively, and a reduced connecting member 26 extending between the panels. The panels 22 and 24 define a transceiver compartment 27 in the tool within which the acoustic transceiver is mounted. The transceiver compartment is provided with a peripheral window 28 which is relatively transparent to acoustic energy. The window 28 may be formed of a suitable material which desirably has an acoustic impedance close to the impedance of the well fluid 14. The transceiver compartment also is filled with a suitable coupling liquid which prevents the window 28 from collapsing under the hydrostatic head of the well fluid and which desirably has an acoustic impedance close to that of the well fluid 14 and the window 28. By way of example, window 28 may be formed of a .05" thick Hycar rubber sleeve and the liquid may be a light oil such as SAE 10W motor oil.

A transceiver support 30 is mounted in the compartment 27 for rotational movement about the connecting member 26. An acoustic transceiver 32 is mounted on the support 30. The transceiver 32 is a directional electroacoustic transducer which is oriented such that its directional transmission path extends laterally from the tool normal to the axis of rotation of support 30. By way of example, the transceiver 32 may be a piezoelectric crystal of lead zirconate titanate having a resonant frequency within the range of one to two megahertz.

The logging tool also is provided with a prime mover such as electric motor 33. A drive mechanism indicated by broken line 34 interconnects the prime mover and the transceiver support 30 so that the transceiver 32 may be rotated throughout a 360° scan of the well. The upper and lower sections 35 and 36, respectively, of the logging tool may be provided with a suitable centralizing means (not shown) for positioning the tool concentrically within the well.

It will be recognized that the transceiver 32 is protected from impact and injury as might occur during movement of the tool 10 through the well. The upper and lower sections 35 and 36 shield the transceiver from possible longitudinal contact with obstructions in the well and the recessed location of the transceiver within the compartment 27 greatly reduces the possibility of lateral impact. Thus, it can be seen that the logging tool 10 provides structural protection for the transceiver element 32.

In operation of the system illustrated in FIGURE 1, the logging tool is lowered into the well and the prime mover 33 is energized to rotate the transducer support 30 about the connecting member 26. The transceiver 32 is excited to generate pulses of acoustic energy which travel outwardly predominantly in a confined, narrow beam path normal to the wall of the well 12. For example, the transceiver may directionally transmit and receive an acoustic signal having a predominant frequency within the range of one to two megahertz. The transceiver may be rotated at 100 to 400 revolutions per minute and the signal pulses may be transmitted at repetition frequency on the order of 2,000 times per second. A portion of the transmitted acoustic energy is reflected from the wall of the well and is detected by the transceiver and converted into representative signals such as electric pulses. These signals then are transmitted to the surface by suitable communication channels in the cable 11 where they are received at the surface by the remote circuitry 16 which functions in response to the signals to intensity modulate the beam of the cathode ray oscilloscope 18. The logging tool also is provided with position indicating means (not shown) which functions to transmit a position signal to the surface which is representative of the angular position of the transceiver within the well. This position signal operates to horizontally sweep the oscilloscope beam across the face of the oscilloscope in proportion to the angular position of the transceiver within the well. As the logging tool 10 is moved upwardly through the well a depth indicating means such as measuring sheave 37 which is rotated by the cable 11 generates a depth signal which functions to control the sweep of the oscilloscope beam vertically across the face of the oscilloscope.

From the foregoing description, it will be recognized that as the logging tool is moved upwardly or downwardly through the well and the transceiver 32 is rotated throughout a 360° scan, a display is produced on the face of the oscilloscope which is correlated with the depth of the logging tool within the well. Whenever the beam of acoustic pulses generated by the transceiver 37 encounters an anomaly such as a fracture in the wall of the well, the acoustic energy is not reflected directly back to the transceiver. When a pulse is not received by the transceiver the remote circuitry does not receive a representative signal to intensity modulate the beam of the oscilloscope and a gap is indicated on the face of the oscilloscope. The oscilloscope face thus presents a display of anomalies found in the wall of the well.

While the acoustic logging system has thus far been described with regard to surveying the face of the well, it will be recognized that the system may be utilized in surveying the adjacent subterranean formations. For example, the logging system may be utilized to determine the orientation of anomalies in the subterranean formations at locations spaced from the wall of the well. Utilizing the system to log the adjacent formations, it is desired to utilize a transceiver which directionally transmits and receives within a lower frequency range than that heretofore described. For example, the transceiver may be one that transmits and receives a directional acoustic signal having a predominant frequency within the range of 50 to 100 kilohertz. In this case it will also be necessary to utilize a lower repetition frequency for pulse transmission and the transceiver itself should be rotated at a lower speed. Thus, the repetition frequency may be 50 pulses per second and the transceiver rotated at one r.p.m.

Turning now to FIGURE 2, there is illustrated an enlarged view of the transceiver compartment 27 of the tool showing in detail the transceiver and transceiver support and the attendant elements of the transceiver assembly. The transceiver support 30 is secured by means of collars 38 and 39 to a cylindrical carriage member 42 which is mounted on bearings 43 and 44 for rotational movement about the connecting member 26. A spur gear 46 is mounted on the carriage member and engages a pinion gear 49 which is mounted on a drive shaft 48. The drive shaft is journalled in the upper panel 22 and is connected to the motor 33 (FIGURE 1) whereby the carriage member, transceiver support, and transceiver are rotated upon energization of the motor.

As noted previously, upon firing of the transceiver 32 acoustic energy is transmitted inwardly along a secondary transmission path through the transceiver support 30. In accordance with the present invention, this energy is reflected away from the transceiver by means of a reflective interface of acoustically mismatched materials formed in the transceiver support. The means forming the interface is best shown in FIGURE 3. With reference to FIGURE 3, the surface forming the inner channel 50 of the transducer support 30, through which the connecting member 26 and carriage member 42 extend (FIGURE 2), is recessed behind the transceiver 32 in order to provide a planar surface 52 which is inclined at an oblique angle with respect to the secondary or inward transmission path indicated by broken lines 54 and 56. Preferably, the recess is in fluid communication with compartment 27 so that the recess is filled with the coupling liquid within the compartment. Thus, the pressure in the recess is equalized with the pressure in compartment 27. However, if desired, the recess may be filled with a solid acoustic attenuating material such as rubber. In any case, it will be recognized that the interface between the material forming the transceiver support and the material filling the recess provides a reflective interface for acoustic energy traveling inwardly through the support 30 generally along the path indicated by broken lines 54 and 56.

While the interface 52 is shown at a monoplanar surface, it is to be recognized that the reflective interface may take any other suitable form such as a curved surface. Also, the interface may be formed by means other than a recess in the inner channel of the support, as shown in FIGURE 3. For example, the transceiver support may be provided with a inclined recess extending inwardly behind the transceiver in order to form the reflective interface.

The inclination to interface 52 with respect to the inward transmission path 54, 56 preferably is such that substantially all of the incident energy traveling parallel along the path, i.e., parallel to lines 54 and 56, will be deflected away from the transceiver 32. FIGURE 3 shows schematically the incidence and reflection with respect to interface 52 of acoustic energy traveling along incremental paths parallel to the path 54, 56. Thus, lines 40 and 41 are representative of incremental paths of incident and lines 40a and 41a are representative of incremental paths of reflection. From an examination of FIGURE 3 it can be seen that the reflected energy will be transmitted around the annular support 30 along paths such as indicated by lines 40a and 41a whereby it will be attenuated within the support. In addition, the face 58 of the recess forms a second reflective interface wherein at least a portion of the reflected energy which travels around the annular support will be reflected back in a reverse direction. Thus, only a small amount of the energy initially transmitted along the inward transmission path 54, 56 will ultimately reach the transceiver 32.

As noted previously, substantially all of the energy traveling parallel along path 54, 56 preferably is deflected away from the transceiver 32. From an examination of FIGURE 3, it can be seen that this condition is satisfied if at all points on the reflective interface 52 the tangent of the angle of deflection between the incident energy and the reflected energy is greater than the ratio of the distance along the transceiver between the point of incidence and the edge of the transceiver to the distance between the transceiver and the point of incidence at the interface. Thus, for example, the tangent of the angle $\theta$ between incident path 40 and reflected path 40a is greater than the ratio of the distance A along the transceiver to the distance B along line 40 between the transceiver and reflective interface 52.

Even where, as shown in FIGURE 3, the inclination of the reflective interface with respect to the transceiver is such that energy traveling along parallel paths such as 40 and 41 are reflected away from the transceiver, it is to be recognized that some small portion of energy will be reflected directly back to the transceiver. In this regard, while transceiver 32 is of the directional type in which most of the energy at a predominant frequency is transmitted substantially parallel along the path 54, 56, some energy deviates from the primary transmission path 54, 56 and follows secondary paths which are angularly deflected from the primary path. A portion of the acoustic energy following these secondary paths will be reflected directly back to the transceiver. Also, even if the surface 52 is machined to a close tolerance, it is probable that minute irregularities will be present. The presence of such irregularities will, of course, also result in some energy being transmitted directly back to the transceiver 32.

It can be seen that the invention provides a logging tool in which the transceiver 32 may be firmly mounted such that it is not easily shifted from its desired orientation. The support 30 may be formed of a structurally rigid material such as steel, aluminum, brass, or lead in order to provide a firm mounting for the transceiver which will sustain the rigors of filed use. Yet at the same time the noise level in the transceiver can be kept to an acceptably low level whereby satisfactory survey results may be obtained.

Turning now to FIGURE 4, there is shown a transceiver support wherein there is provided an interface of acoustically mismatched materials which diverges in opposed directions away from the transceiver from a location within the path. By this configuration, portions of the acoustic energy transmitted along the inward path will be reflected away from the transceiver in opposed directions such that enhanced attenuation of such energy is obtained within the transceiver support. More particularly and with reference to FIGURE 4, there is shown a transceiver support 60 having a transceiver 32 mounted on the outer face thereof and provided with a recess in the inner channel thereof which forms an interface 62. Interface 62 comprises two diverget planar faces 63 and 64 which intersect at an apex approximately in the center of the transmission path 65, 66. From an examination of the exemplary incident energy paths 67 and 70 and reflected energy paths 68a and 70a it can be seen that energy is reflected away from the transceiver and travels through the transceiver support 60 in opposed directions whereby they will tend to cancel one another, thus, enhancing the attenuation of acoustic energy within the transceiver support. In addition, by virtue of the divergent configuration of the reflective interface, substantial reflection of energy away from the transceiver 32 can be achieved by intersection of each of the faces 63 and 64 with the transmission path 65, 66 at a smaller angle than may be accomplished by a single face as shown in FIGURE 3. Stated otherwise, the angles $\theta_2$ and $\theta_3$ at which the planes of faces 63 and 64, respectively, intersect the plane of the transceiver 32 may each be a smaller acute angle than the angle $\theta_1$ as shown in FIGURE 3. This, of course, will result in a smaller angle of incidence of the energy traveling along paths such as 68 and 70 in FIGURE 4, thus producing a smaller angle of deflection between incident and reflected energy paths with the attendant result that the transmission paths through the transceiver support are of increased distances. This will further attenuate energy transmitted through the support 60 and in addition will increase the travel time of such energy through the support which ultimately reaches the transceiver 32.

Turning now to FIGURE 5, there is illustrated a transceiver support embodying another form of the invention in which there is provided a recess extending completely through the transceiver support to provide a second reflective interface which greatly increases the path which reflected energy must follow through the transceiver support before being returned to the transceiver. More particularly and with reference to FIGURE 5, there is shown a transceiver support 80 with a recess extending therethrough to provide a first reflective interface 87 and a second reflective interface 84. From an examination of FIGURE 5, it will be recognized that energy reflected from interface 87 will travel through the annular support 80 to the second interface 84 whereupon it will be reflected back in the opposite direction. By this embodiment of the invention the transmission path through the transceiver support is increased significantly thus resulting in greater attenuation of the energy which ultimately reaches the transceiver 32.

In the embodiments described above, the transceiver is coupled directly to the transceiver support. In a further embodiment of the invention shown in FIGURE 6, the transceiver is firmly mounted on the support but is coupled thereto through acoustic insulating material. More particularly, and with reference to FIGURE 6, there is shown a transceiver support 86 which is provided with a bore 88 extending laterally therethrough from the outer surface of the support. The bore 88 is provided with a circumferential recess 90 in which the transceiver 32 is secured. Interposed between the walls of recess 90 and the transceiver 32 is a lining 91 formed of acoustic attenuating material. As shown in FIGURE 6, recess 90 may be formed by grooves 90a, 90b, and 90c, the groove 90b being of a greater diameter than grooves 90a and 90c. The lining 91 may be formed by rubber O-rings 91a, 91b, and 91c which are inserted respectively in grooves 90a, 90b, and 90c. The transceiver 32 bridging the bore 88 is, of course, secured in place between the O-rings 91a and 91c.

Mounted adjacent the inner end of the bore 88 is a member 92 which, as shown, provides a divergent reflective interface 94 behind the transceiver 32. The member 92 preferably is formed of a material having a relatively high acoustic impedance. For example, member 92 may be formed of fiberglass. From an examination of FIGURE 6, it will be recognized that a substantial portion of the incident energy traveling parallel along the inward transmission path from the transceiver 32 will be reflected from the interface 94 away from the transceiver 32. The space 96 in the bore between the interface 94 and the transceiver 32 is filled with a liquid in order to prevent rupturing of the transceiver under the high pressure conditions encountered in the well. Means, such as a passage 97, extending through the support provides for fluid communication between the space 96 and the exterior of the transceiver support, thus, providing for pressure equalization on both sides of the transceiver 32.

Turning now to FIGURE 7, there is shown an embodiment of the invention in which the reflective interface is of a configuration which disperses the acoustic energy directly transmitted inwardly through the transceiver support. More particularly, and with reference to FIGURE 7, there is shown a transceiver support 74 in which is provided an irregular, multi-faceted interface 76 behind the transceiver 32. The irregular interface may be formed through the provision of a plurality of serrations or dentations on the nonrecessed interior channel surface of the support 74 as shown. Also, the irregular interface may be formed by serrating or dentating the reflective interfaces shown in FIGURES 3, 4, 5, and 6. By this embodiment of the invention the inwardly transmitted energy is dispersed in a multitude of directions such that a coherent energy beam is not reflected back to the transceiver 32.

As noted previously, it is preferred that substantially all of the inward transmission path be intersected by the reflective interface at an angle such that incident energy traveling parallel along the inward path will be reflected away from the transceiver. However, it is recognized that in some instances practical considerations such as the relative dimensions of the transceiver and the support member may render it difficult to satisfy this criterion. In logging relatively large wells, e.g., wells having a diameter on the order of one foot or more, low noise level usually can be obtained by intersecting at least 0.5 of the inward transmission path by the reflective interface at an angle such that incident energy traveling parallel along the path will be reflected away from the transceiver and it is preferred to meet at least this condition. Thus, with regard to FIGURE 3, as exemplary, at least 0.5 of the plane of intersection of path 54, 56 and interface 52 should be inclined such that at a given point the tangent of the angle $\theta$ between incidence and reflection is greater than the ratio A/B corresponding to this point. In logging smaller wells having a diameter of about six inches or less, it will be desirable to intersect at least 0.8 of the inward transmission path by the reflective interface such that the parallel incident energy is reflected away from the transceiver. Thus, in order for the tool to yield good results in even small diameter wells it is preferred to satisfy this condition where practical.

Having described specific embodiments of the instant invention, it will be understood that further modifications therof may be suggested to those skilled in the art, and it is intended to cover all such modifications as fall within the scope of the appended claims.

What is claimed is:
1. In the logging of a well by acoustic energy, the method comprising:
 (a) locating within said well a logging tool comprising a transceiver for transmitting and receiving acoustic energy,
 (b) transmitting acoustic energy from said transceiver along a primary transmission path normal to a subterranean interface and receiving at said transceiver acoustic signals reflected from said subterranean interface,
 (c) concomitantly with the transmission of acoustic energy along said primary path, transmitting acoustic energy from said transceiver along a secondary transmission path opposed in direction to said primary path, and
 (d) contacting said acoustic energy transmitted along said secondary path at an oblique angle with a second interface within said well formed of acoustically mismatched materials, and reflecting a substantial portion of said acoustic energy away from said transceiver.

2. The method of claim 1 wherein said transceiver is rotated through a 360° span within said well.

3. The method of claim 2 wherein said secondary transmission path is intersected through at least 0.5 thereof by said second interface at an angle such that incident energy traveling parallel along said secondary path will be deflected away from said transceiver.

4. The method of claim 2 wherein said secondary transmission path is intersected through at least 0.8 thereof by said second interface at an angle such that incident energy traveling parallel along said secondary path will be deflected away from said transceiver.

5. The method of claim 2 wherein substantially all of said secondary transmission path is intersected by said second interface at an angle such that incident energy traveling parallel along said secondary path will be deflected away from said transceiver.

6. In an acoustic well logging tool adapted to be moved longitudinally through a well, the combination comprising:
   a transceiver support mounted in said tool,
   an acoustic transceiver mounted on said support for transmitting acoustic energy away from said support along an outward transmission path and receiving reflected acoustic energy, said transceiver also transmitting acoustic energy inwardly along an inward transmission path through said support,
   means in said transceiver support forming an interface of acoustically mismatched materials behind said transceiver intersecting said inward transmission path at an oblique angle whereby a substantial portion of said acoustic energy transmitted along said inward path is reflected away from said transceiver.

7. The combination of claim 6 wherein said inward transmission path is intersected through at least 0.5 thereof by said interface at an angle such that incident energy traveling parallel along said path will be deflected away from said transceiver.

8. The combination of claim 6 wherein said inward transmission path is intersected through at least 0.8 thereof by said interface at an angle such that incident energy traveling parallel along said path will be deflected away from said transceiver.

9. The combination of claim 6 wherein substantially all of said inward transmission path is intersected by said interface at an angle such that incident energy traveling parallel along said path will be deflected away from said transceiver.

10. The combination of claim 6 wherein said interface diverges in opposed directions away from said transducer from a location within said path whereby portions of acoustic energy transmitted along said inward path are reflected away from said transceiver in opposed directions.

11. The combination of claim 6 wherein said interface is serrated whereby said reflected acoustic energy is dispersed.

12. The combination of claim 6 wherein said transceiver support is annular shaped and said interface is formed by a recess in said annular support.

13. The combination of claim 12 wherein said interface diverges in opposed directions away from said transducer from a location within said path whereby portions of acoustic energy transmitted along said inward path are reflected away from said transceiver in opposed directions.

14. The combination of claim 6 wherein said transceiver support is annular shaped and said interface is formed by serrations in the inner surface of said support whereby said reflected acoustic energy is dispersed.

15. The combination of claim 6 wherein said transceiver support is annular shaped and said interface is formed by a recess extending through a substantial portion of said annular support, said recess also forming a second interface of acoustically mismatched materials in said annular support whereby energy reflected from said first-named interface and transmitted through said support is reflected from said second interface.

16. The combination of claim 15 wherein said recess extends laterally through said annular support whereby said annular support is divided by said recess.

17. The combination of claim 6 wherein said transceiver support is an annular shaped member provided with a bore extending laterally therethrough from the outer surface of said support and in which said transceiver is mounted in a position bridging said bore, and a member bridging said bore adjacent the inner end thereof and providing said interface.

18. The combination of claim 17 wherein said bore is provided with a peripheral recess within which said transceiver is secured, and further comprising a lining formed of acoustic attenuating material interposed between said transceiver and the wall of said recess.

19. In an acoustic well logging tool adapted to be moved longitudinally through a well, the combination comprising:
   a support structure in said tool including longitudinally spaced panel members and a reduced connecting member extending between said panel members, said panel members defining a transceiver compartment in said tool,
   a transceiver support mounted in said compartment for rotation about said connecting member,
   an acoustic transceiver mounted on said support for transmitting acoustic energy away from said support along an outward transmission path and receiving reflected acoustic energy, said transceiver also transmitting acoustic energy inwardly along an inward transmission path through said support, and
   means in said transceiver support forming an interface of acoustically mismatched materials behind said transceiver intersecting said inward transmission path at an oblique angle whereby a substantial portion of said acoustic energy transmitted along said inward path is reflected away from said transceiver.

20. The combination of claim 19 wherein said transceiver support is annular shaped with said connecting member extending through the channel defined by the inner surface of said annular support.

21. The combination of claim 20 wherein said interface is formed by a recess in the inner surface of said annular support.

22. The combination of claim 21 wherein said transceiver compartment and said recess are filled with liquid and are in fluid communication whereby the pressure in said recess and compartment may be equalized.

23. The combination of claim 21 wherein said interface diverges in opposed directions away from said transducer from a location within said path whereby portions of acoustic energy transmitted along said inward path are reflected away from said transceiver in opposed directions.

24. The combination of claim 20 wherein said interface is formed by serrations in the inner surface of said annular support whereby said reflected acoustic energy is dispersed.

25. The combination of claim 20 wherein said interface is formed by a recess extending through a substantial portion of said annular support, said recess also forming a second interface of acoustically mismatched materials in said annular support whereby energy reflected from said first-named interface and transmitted through said support is reflected from said second interface.

26. The combination of claim 25 wherein said recess extends laterally through said annular support whereby said annular support is divided by said recess.

27. The combination of claim 20 wherein said annular support is provided with a bore extending laterally therethrough from the outer surface of said support in which said transceiver is mounted in a position bridging said bore, and a member bridging said bore adjacent the inner end thereof and providing said interface.

28. The combination of claim 27 wherein said transceiver compartment and the space in said bore between said transceiver and said inner member are filled with liquid and are in fluid communication whereby the pressure across said transceiver may be equalized.

29. The combination of claim 28 wherein said bore is provided with a peripheral recess within which said transceiver is secured, and further comprising a lining formed by acoustic attenuating material interposed between said transceiver and the wall of said recess.

References Cited

UNITED STATES PATENTS

| 2,631,270 | 3/1953 | Goble | 181—.5 |
| 3,051,927 | 8/1962 | Mazzagatti | 340—10 |

SAMUEL FEINBERG, *Primary Examiner.*